United States Patent
Baker et al.

(10) Patent No.: US 10,740,836 B2
(45) Date of Patent: *Aug. 11, 2020

(54) APPARATUS AND METHOD FOR DYNAMIC OFFLINE BALANCE MANAGEMENT FOR PREAUTHORIZED SMART CARDS

(71) Applicant: MasterCard International Incorporated, Purchase, NY (US)

(72) Inventors: Aaron Baker, Basingstoke (GB); Colin Tanner, Uxbridge (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/905,580

(22) Filed: Feb. 26, 2018

(65) Prior Publication Data

US 2018/0182027 A1 Jun. 28, 2018

Related U.S. Application Data

(63) Continuation of application No. 12/832,288, filed on Jul. 8, 2010, now Pat. No. 9,911,154.

(51) Int. Cl.
| | |
|---|---|
| *G06Q 40/02* | (2012.01) |
| *G06Q 20/10* | (2012.01) |
| *G06Q 20/28* | (2012.01) |
| *G06Q 40/00* | (2012.01) |
| *G06Q 20/36* | (2012.01) |
| *G07F 7/12* | (2006.01) |

(52) U.S. Cl.
CPC ........... *G06Q 40/00* (2013.01); *G06Q 20/105* (2013.01); *G06Q 20/36* (2013.01); *G06Q 20/367* (2013.01); *G06Q 20/3676* (2013.01); *G07F 7/127* (2013.01)

(58) Field of Classification Search
CPC ......... G06Q 40/02; G06Q 20/10; G06Q 20/28
USPC ......................................................... 705/41
See application file for complete search history.

(56) References Cited

U.S. PATENT DOCUMENTS

| | | | |
|---|---|---|---|
| 4,011,433 | A | 3/1977 | Tateisi et al. |
| 5,819,234 | A | 10/1998 | Slavin |
| 6,101,477 | A | 8/2000 | Hohle et al. |
| 6,116,505 | A | 9/2000 | Withrow |
| 6,119,945 | A | 9/2000 | Muller et al. |

(Continued)

FOREIGN PATENT DOCUMENTS

| | | |
|---|---|---|
| WO | WO00/02150 | 1/2000 |
| WO | WO01/43095 | 6/2001 |

OTHER PUBLICATIONS

"Top-Up Card" Apr. 13, 2010 p. 1-2 downloaded from http://web.archive.org/web/20100413134103/http://english.bzwbk.pl/28600.

(Continued)

*Primary Examiner* — Hai Tran
(74) *Attorney, Agent, or Firm* — Otterstedt, Wallace & Kammer, LLP

(57) ABSTRACT

A smart payment device is issued to a user; the device is capable of both offline and online transactions and has a total available balance split. The split is between an available offline balance and an available online balance. It is determined whether the user has entered a primarily offline environment or will imminently enter a primarily offline environment. If this is so, the total available balance split is redistributed to favor offline transactions.

15 Claims, 5 Drawing Sheets

(56) References Cited

U.S. PATENT DOCUMENTS

| | | |
|---|---|---|
| 6,226,624 B1 | 5/2001 | Watson |
| 6,375,084 B1 | 4/2002 | Stanford et al. |
| 6,398,110 B1 | 6/2002 | Kikuchi |
| 6,402,038 B1 | 6/2002 | Stanford et al. |
| 2001/0018660 A1 | 8/2001 | Sehr |
| 2002/0147907 A1 | 10/2002 | Ross |
| 2003/0101096 A1 | 5/2003 | Suzuki |
| 2004/0039694 A1 | 2/2004 | Dunn |
| 2004/0230535 A1 | 11/2004 | Binder |
| 2004/0238624 A1 | 12/2004 | Nakano et al. |
| 2004/0243510 A1 | 12/2004 | Hinderer |
| 2006/0049258 A1 | 3/2006 | Piikivi |
| 2007/0012763 A1 | 1/2007 | Van de Velde et al. |
| 2007/0168260 A1 | 7/2007 | Cunescu |
| 2008/0116264 A1* | 5/2008 | Hammad ............ G06Q 20/045 235/382 |
| 2008/0203151 A1* | 8/2008 | Dixon ................... G06K 17/00 235/380 |
| 2009/0171682 A1* | 7/2009 | Dixon ................... G06Q 20/20 705/346 |
| 2010/0317318 A1* | 12/2010 | Carter ................... G06Q 20/20 455/408 |
| 2010/0318446 A1* | 12/2010 | Carter ................. G06Q 20/105 705/30 |
| 2012/0011062 A1 | 1/2012 | Baker et al. |

OTHER PUBLICATIONS

"PremiumTop-Up Card" Mar. 2, 2009 p. 1 downloaded from http://web.archive.org/web/20090302102604/http://english.bzwbk.pl/3495.

"Pre-Paid Cards" Jan. 25, 2010 p. 1 downloaded from http://web.archive.org/web/20100125200613/http://english.bzwbk.pl/38134.

"Near field communication" p. 1-16 downloaded from http://en.wikipedia.org/wiki/Near_field_communication on Jun. 11, 2012.

* cited by examiner

APPARATUS AND METHOD FOR DYNAMIC OFFLINE BALANCE MANAGEMENT FOR PREAUTHORIZED SMART CARDS

CROSS-REFERENCE TO RELATED APPLICATIONS

This patent application is a continuation of U.S. patent application Ser. No. 12/832,288, filed Jul. 8, 2010, entitled "APPARATUS AND METHOD FOR DYNAMIC OFFLINE BALANCE MANAGEMENT FOR PREAUTHORIZED SMART CARDS." The complete disclosure of the aforementioned U.S. patent application Ser. No. 12/832,288 is expressly incorporated herein by reference in its entirety for all purposes.

FIELD OF THE INVENTION

The present invention relates generally to the electronic and computer arts, and, more particularly, to apparatus and methods for electronic payment.

BACKGROUND OF THE INVENTION

Devices, such as electronic devices, and particularly electronic payment devices (for example, so-called "smart cards" having integrated circuit chips) may be useful for a variety of payment and other applications. In chip based payment products, the total funds available to the cardholder can either be located on the card, which is ideal for off-line purchases, or can be located on the payment provider's (e.g., the Issuer's) server, which is ideal for on-line purchases. However, depending on where the funds are located, some functionality may not be available. For example, a preauthorized off-line card balance cannot be used for telephone or internet purchases. An on-line balance may not be ideal at merchant locations that cannot support high speed on-line authorizations or where fast throughput requirements favor offline transactions (for example, the entrance to a transit system such as an underground, metro, subway, or the like).

Such products may accordingly split any funds available between the on-line and off-line balances, in which case the whole balance may not be available for a particular transaction, and the cardholder may not understand why. If the total funds available are significant (e.g. >$1000), the cardholder is unlikely to perceive an issue; however for cards where only limited funds are available (e.g. <$50), the issue may be more significant.

Heretofore, for cards supporting the two balances, the level of preauthorized offline balance is fixed by the Issuer, typically at the same level across an entire portfolio. When the card is involved in an online transaction via the contact interface, the offline counters are reset (effectively topping up the preauthorized offline balance to the predetermined fixed value), provided that sufficient overall funds are available. In most cases (typically essential with prepaid cards), the portion of the total balance available with the online balance is decreased by an equivalent amount. As the card is then used in an offline environment, the available preauthorized offline balance is depleted until an online transaction via the contact interface is undertaken, resetting the balance to the predetermined fixed value.

With regard to the aforementioned offline counters, the skilled artisan will appreciate that in at least some instances, in the case of a bank card, a value is not truly held on the card as was historically done with an electronic purse such as Mondex® products (registered mark of Mondex International Limited, 47-53 Cannon Street London UNITED KINGDOM EC4M 5SQ). Rather, the counter represents an amount of money which the card has the ability to spend without going online to the issuer; as such, this amount is a pre-authorized amount. Normally, with a bank card, in order to spend money, it is necessary to have the transaction authorized by going online to communicate with the issuer of the card. The offline counters give the card the ability to spend offline a predetermined amount. Typically, offline counters may include multiple counters; for example, one or more counters representing value and one or more counters representing a number of transactions that can be made offline. The offline counters thus represent a number of security features on the card (typically counters which count down)—for example, the counters may be such that $50 of offline spending, or ten offline transactions, whichever is reached first, cause the card to go back online.

SUMMARY OF THE INVENTION

Principles of the invention provide techniques for combining cryptograms for contactless card payments. In one aspect, an exemplary method includes the step of issuing a smart payment device to a user. The smart payment device is capable of both offline and online transactions, and has a total available balance split. The split is between an available offline balance and an available online balance. An additional step includes determining whether at least one of the following conditions is true: (i) the user has entered a primarily offline environment; and (ii) the user will imminently enter a primarily offline environment. If at least one of the conditions is true, a further step includes redistributing the total available balance split to favor the offline transactions.

In at least some cases, the determining step is a first determining step, and a second determining step, subsequent to the redistributing of the total available balance split to favor the offline transactions, determines whether at least one of the following conditions is true: (i) the user has departed the primarily offline environment; and (ii) the user will imminently depart the primarily offline environment. If so, an additional step includes redistributing the total available balance split to favor the online transactions.

In another aspect, an exemplary system includes an issuer server and a smart payment device capable of both offline and online transactions. The smart payment device has a total available balance split. The split is between an available offline balance and an available online balance. The system also includes a plurality of merchant terminals and a payment processing network coupling the issuer server and the plurality of merchant terminals. The smart payment device is configured for communication with the plurality of merchant terminals. The issuer server is operative to obtain an indication as to whether at least one of the following conditions is true: (i) the smart payment device has entered a primarily offline environment; and (ii) the smart payment device will imminently enter the primarily offline environment. If such is the case, the issuer server is operative to redistribute the total available balance split to favor the offline transactions.

In some cases, the issuer server generates the indication itself, while in other instances, it is received from a merchant server (or the smart payment device can be a geographically aware mobile device).

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention can provide substantial beneficial technical effects. For example, in most markets, there will be a combination of cards deployed; some of which are online, some of which are offline, and some of which have the capability to do both. In certain environments, it is advantageous to work in either an online or an offline mode. Embodiments of the invention advantageously allow, in an environment which seeks to maximize the number of offline transactions, the ability to instruct and/or request the card to associate a greater balance with the offline monies available, such that they can predominately work in an offline situation. Such environments would then benefit from greater transaction speed and overcoming of delays and/or lack of service for online transactions (e.g., an open air festival or other event). Furthermore, via an exit gate or other approach, the card can be moved back to the original fund availability split in due course.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
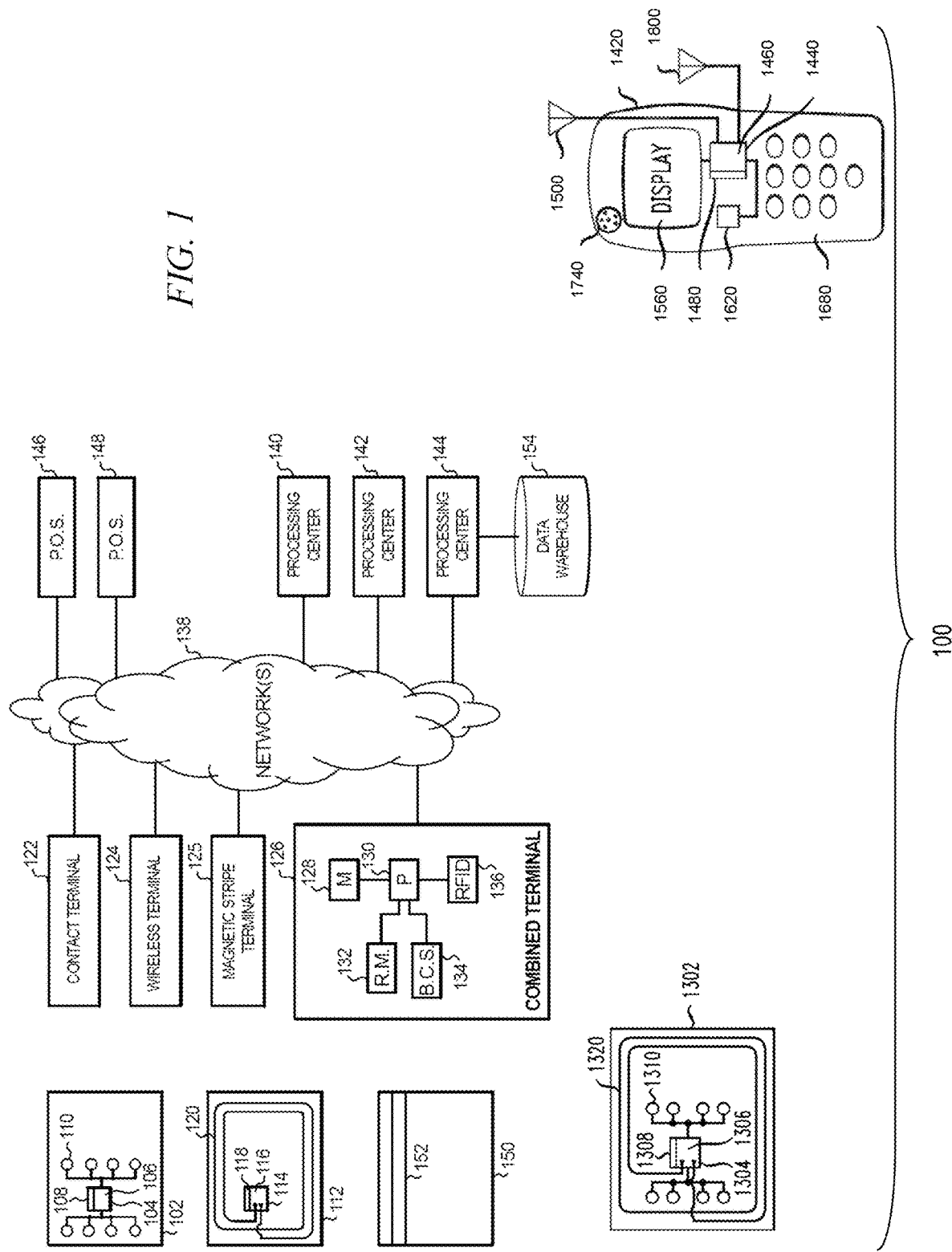
FIG. 1 shows an example of a system and various components thereof that can implement techniques of the invention.

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory (e.g., one or more EEPROMs as discussed below). The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 Jun. 2008

EMV Integrated Circuit Card Specifications for Payment Systems Book 2 Security and Key Management Version 4.2 Jun. 2008

EMV Integrated Circuit Card Specifications for Payment Systems Book 3 Application Specification Version 4.2 Jun. 2008

EMV Integrated Circuit Card Specifications for Payment Systems Book 4 Cardholder, Attendant, and Acquirer Interface Requirements Version 4.2 June 2008

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. In some cases, the cards, or other payment devices, can include body portions (e.g., laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

In one or more versions of the infrastructure, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 can also be employed in infrastructure 100. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for the payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided.

The description of devices, elements, or components 102, 104, 106, 108, 110, 112, 114, 116, 118, 120 throughout this document are equally applicable to the corresponding items in the dual interface card 1302 and cellular telephone handset 1420.

Figure 2:
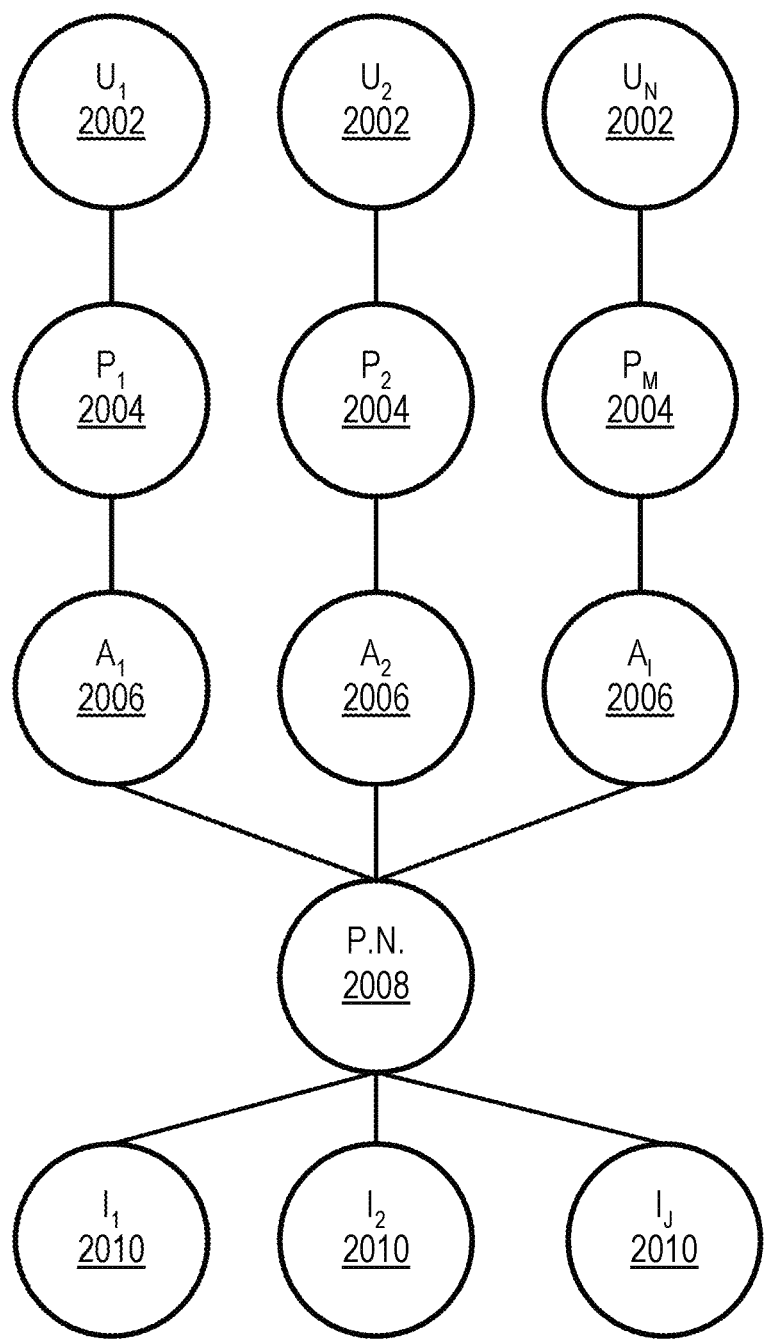
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_L$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer.

Some embodiments may be employed with payment systems such as EMV where some transactions may be authorized offline without the authorization request and response exchange with the issuer and these offline authorized transactions are also stored in "batches" which are later sent for clearing and settlement.

One or more embodiments of the invention allow the split of total funds available to the cardholder between the preauthorized off-line and on-line balances on a prepaid, credit, or debit card to be managed dynamically, in order to improve the usability of the product to the cardholder.

Several patent publications address payment devices with offline and online capability. These include US Patent Publication 2007/0168260 of Cunescu et al, entitled Payment Apparatus and Method, and US Patent Publication 2004/0230535 of Binder et al., entitled Method and System for Conducting Off-Line and On-Line Pre-Authorized Payment Transactions. The complete disclosures of both the aforesaid US Patent Publications are expressly incorporated herein by reference in their entirety for all purposes.

As noted above, in chip based payment products, the total funds available to the cardholder can either be located on the card, which is ideal for off-line purchases, or can be located on the payment provider's server (the Issuer), which is ideal for on-line purchases. However depending where the funds are located, some functionality may not be available. For example, a preauthorized off-line card balance cannot be used for telephone or internet purchases. An on-line balance may not be ideal at merchant locations that cannot support high speed on-line authorizations or where fast throughput requirements favor offline transactions (for example, the entrance to a transit system such as an underground, metro, subway, or the like).

As used herein, an "on-line" transaction is one which undergoes a conventional authorization request and authorization response process, typically with the issuer (understood to also include an issuer processor acting on the issuer's behalf). The actual authorization provided back to the terminal may not come from the issuer; a third party may provide same on behalf of the issuer. Furthermore, an "off-line" transaction is one which does not undergo such a conventional process, but rather relies on local approval between the card and terminal, based on a balance stored on the card or the like; that is, the terminal seeks approval for the transaction from the card.

A contact transaction as referenced in the EMV payment standards is conducted with a card via a physical electrical connection to that card, typically, through a series of up to eight contacts. A contactless transaction as referenced in the EMV payment standards is conducted with a card via electromagnetic waves such as a radio signal, where no physical contact is required. Furthermore, a contact interface is defined in the ISO/IEC 7816 while a contactless interface is defined in ISO/IEC 14443 and/or in the NFC Standard. With regard to the latter, NFC was approved as an ISO/IEC standard on Dec. 8, 2003 and later as an ECMA standard. NFC is an open platform technology standardized in ECMA-340 and ISO/IEC 18092. The modulation schemes, coding, transfer speeds and frame format of the RF interface of NFC devices are specified in these standards, as are initialization schemes and conditions required for data collision-control during initialization-for both passive and active NFC modes. The standards also define the transport protocol, including protocol activation and data-exchange methods. Air interface for NFC is standardized in: ISO/IEC 18092/ECMA-340: Near Field Communication Interface and Protocol-1 (NFCIP-1) ISO/IEC 21481/ECMA-352: Near Field Communication Interface and Protocol-2 (NFCIP-2). All documents mentioned in this paragraph, including ISO IEC 7816, ISO/IEC 14443, and the complete suite of documents related to NFC, are expressly incorporated herein by reference in their entirety for all purposes.

Embodiments of the invention do not necessarily require a dual-interface card; a contact interface, contactless interface, or dual interface can be employed. Certain external rules may as a practical matter require use of certain interfaces in particular situations, but the same do not limit embodiments of the invention.

Again, as noted, certain products may accordingly split any funds available between the on-line and off-line balances, in which case the whole balance may not be available for a particular transaction, and the cardholder may not understand why. If the total funds available are significant (e.g. >$1000), the cardholder is unlikely to perceive an issue; however for cards where only limited funds are available (e.g. <$50), the issue may be more significant.

Heretofore, for cards supporting the two balances, the level of preauthorized offline balance is fixed by the Issuer, typically at the same level across an entire portfolio. When the card is involved in an online transaction via the contact interface, the offline counters are reset (effectively topping up the preauthorized offline balance to the predetermined fixed value), provided that sufficient overall funds are available. In most cases (typically essential with prepaid cards), the portion of the total balance available with the online balance is decreased by an equivalent amount. As the card is then used in an offline environment, the available preauthorized offline balance is depleted until an online transaction via the contact interface is undertaken, resetting the balance to the predetermined fixed value.

One or more embodiments of the invention provide a method to dynamically adjust how the total funds are split between the two balances, so that the Issuer can move funds to the most appropriate balance without direct cardholder involvement. In current techniques, the allocation of funds is either left to the cardholder to control, or returned to a pre-determined level each time the card performs an online transaction via the contact interface.

One or more embodiments of the invention are applicable to prepaid, credit, and debit cards which support both an on-line and a preauthorized off-line balance but have only limited overall funds available. Such products are likely to include:

Prepaid cards and/or devices
A credit card and/or device for cardholders with adverse credit history, e.g., having a very restricted credit balance (say, <$500)
A Debit card and/or device where the cardholder has only limited funds available in his or her account. Typically, this aspect may be targeted at student accounts, or accounts for those with restricted income.

One or more instances of the invention may be particularly beneficial for those cards that support a contactless interface, where there can be a much greater difference in cardholder experience between a fast off-line contactless transaction, and a slower on-line contact transaction.

Traditionally, payment cards have offered either online functionality (traditional credit and/or debit), or offline functionality (e.g., an electronic purse such as MONDEX® products). However, with the advent of EMV, traditional credit and/or debit cards can now offer both online and offline functionality. Electronic purse products have largely been withdrawn from the market, replaced by a new class of product designated as "prepaid," using EMV technology.

However, there are limitations of online and offline products, resulting in many Issuers providing the capability to undertake both type of transactions. When the overall funds available are high, the cardholder is unlikely to realize that some of the funds are not available to him or her. If the Issuer of the card also has a full relationship with the cardholder, the Issuer may in fact extend the funds available to the cardholder to totally hide the fact that the funds available have been split between two separate balances.

As environments supporting only transactions offline are typically for only small value items (e.g. a vending machine, parking, and the like), the funds available for offline transactions do not need to be significant. However many environments can benefit from offline operation because of the performance and/or cost benefits of not needing to go online. These environments may be for higher value items (typically £3 to £15 or about $4.50 to $22.50 at March 2010 conversion rates) and will perform a transaction offline if the card allows, otherwise they perform an online transaction.

An Issuer may therefore select to assign £50 or $75 (for example only) of the total funds available to the offline balance. If the overall funds available are greater than £1000 or $1500 for example, it is unlikely that the cardholder will attempt to spend the full balance (£1000 or $1500) online. However, where the overall funds available are low, e.g. £100 or $150, then allocating £50 or $75 to the offline balance may directly impact the cardholder's use of the card for online purchases (only £50 or $75 available). One or more embodiments advantageously provide techniques to better manage how the overall funds are split between balances in such circumstances.

One way to achieve this is to require the cardholder himself or herself to manage how funds are split. While this initially may appear to be a suitable option, less sophisticated cardholders, who may have only limited funds, may not understand the split balance concept. One or more embodiments provide techniques for Issuers to manage the split themselves, without directly involving the cardholder.

One or more embodiments allow the funds available on the offline balance to be managed dynamically, i.e., changing the default offline balance individually for each cardholder based on that cardholder's historic use of the functionality, or the environment the cardholder is currently known to be using the card within. In at least some instances, two default balances are maintained by the Issuer, namely, an upper and lower limit for the offline balance. Where the cardholder is not expected to be using the offline functionality extensively, the lower limit is used to reset the card following an online contact transaction; where the cardholder is expected to use offline functionality extensively, the upper limit is used.

It should be noted that in some prior art approaches, for some products, the offline balance is reset automatically to the pre-determined level following the authorization of an online transaction when using the contact interface. Currently, one or more embodiments "adjust" the offline balance via Issuer scripting during an online contact transaction. Scripting in itself is known to the skilled artisan, who, given the teachings herein, will be able to use scripting to implement one or more embodiments of the invention. Some embodiments can make use of over the air configuration of the offline balance when using a near field communication (NFC) mobile phone or other NFC mobile device enabled with payment technology. The ability to reset or adjust the balance using Issuer scripting may also be provided when conducting transactions via the contactless interface.

In issuer scripting, the smart card or device executes a script message sent by the issuer and then updates the records located on the smart card or device. Script validation is a process where the card uses a shared secret code (between the card and issuer) to validate that a message has arrived at the card unaltered from the message created by the issuer. Using this process to ensure the authenticity of the data, the smart card or device updates the offline balance.

Exemplary techniques to better manage the balance include:
  The maximum offline balance, typical offline balance, and/or the range of the offline balance may be included for information on the cardholder's statement (paper or electronic online copy) or other communication sent periodically, on request, or following a change. This statement informs the cardholder that all funds may not be available for all purchases, as well as the technique employed to split the available funds between the two balances.
  By examining past usage; online vs. offline use, merchant categories that the card is used within, and the cardholder's demographic, the split between on-line and off-line balance, or range for the offline balance (minimum and maximum) may be set for that cardholder, with review undertaken periodically (e.g., once a month).
  The level that the pre-authorized offline balance is reset to following an online transaction (or push of a configuration change to the device) may be determined by:
    1) Analysis of how the card has been used on a daily basis—the on-line and off-line balance may be set (minimum or maximum level) depending on the day of the week. This would be applicable, for example, for cardholders who may frequent nightclubs on Friday and/or Saturday nights.
    2) Examination of the merchant and/or merchant category (e.g., determined from merchant category code (MCC)) the card is being used within as authorizations are received. If a known merchant and/or merchant category that is predominantly offline is detected (for example a club, festival, or event), funds can be immediately redistributed between the on-line and off-line balance as appropriate.
    3) In the case of an NFC-enabled mobile device, location based services may be used to identify that the cardholder has entered an area where transactions will predominantly be undertaken offline (e.g. a theme park, festival, concert, stadium, or the like).
    4) Providing the ability for the cardholder to register his or her entry into an environment where transactions will predominantly be conducted offline.

This may be via a kiosk at the event and/or location where the cardholder is required to tap and/or insert his or her card (cardholder action required, although he or she may not be aware of the changes actually being undertaken). Alternatively, the payment card may be required in order to enter the environment (e.g. payment on entry, a combined ticket and/or payment device, or loyalty and/or VIP card and payment device).

The opposite of the above four methods can also be implemented when the cardholder is identified as having left a predominantly offline environment, to restore the offline balance to its minimum level at each update of the card.

One or more embodiments of the invention may be implemented wholly by the Issuer, or may be implemented in co-operation with the merchant community where the Issuer provides selected merchants (or venues) the ability to request transition between the minimum and maximum values applied to the pre-authorized offline balance. In the case of a music festival or stadium, many of the cards used within the environment may be issued as part of a co-brand agreement between the issuer and event organizer.

Recapitulation

Figure 3:
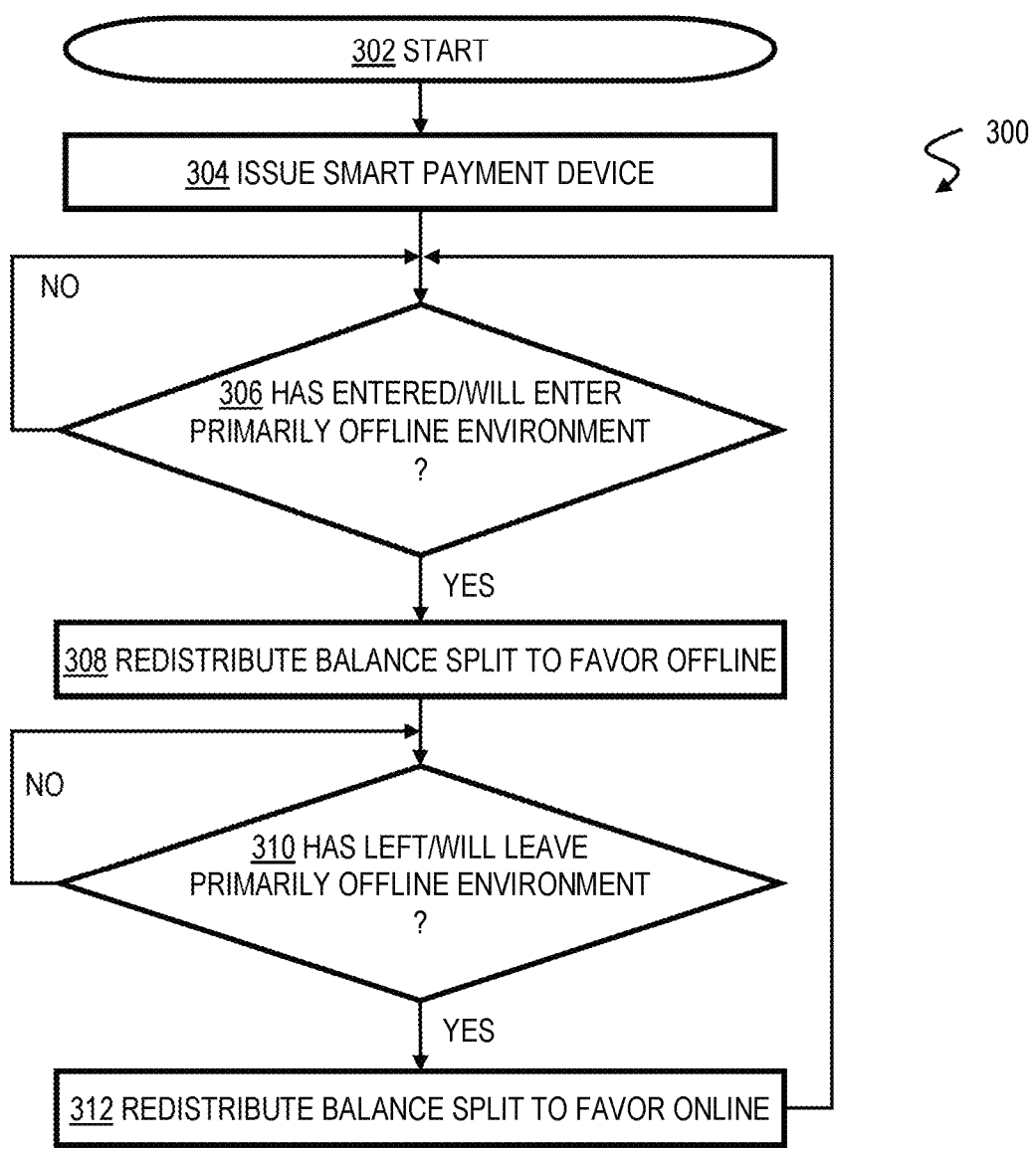
FIG. 3 is an exemplary flow chart according to an aspect of the invention.

Attention should now be given to flow chart 300 of FIG. 3, which begins in block 302. Given the discussion thus far, it will be appreciated that, in general terms, an exemplary method, according to an aspect of the invention, includes the step 304 of issuing a smart payment device to a user. The smart payment device is capable of both offline and online transactions. The smart payment device has a total available balance split ("has" encompasses the case where the actual funds are held on a server but the card or other device is allowed to conduct some transactions offline in accordance with one or more risk management parameters). The split is between an available offline balance and an available online balance. Step 304 can be carried out, for example, by a software module such as an issuer platform located on a server of an issuer or entity acting on behalf of an issuer. An additional step 306 includes determining whether one or more of the following conditions is true: (i) the user has entered a primarily offline environment ("P.O.E.") and (ii) the user will imminently enter a primarily offline environment. This language is intended to encompass the case where decisions are based solely on actual entrance with no capability to determine imminent entrance, solely on imminent entrance with no capability to determine actual entrance, on either or both of actual and imminent entrance with capability to determine both, and any combination of the foregoing. Step 306 can be carried out in a variety of ways as discussed below. If the determining yields a TRUE, as per the "YES" branch of block 306, an additional step 308 includes redistributing the total available balance split to favor offline transactions. Step 308 can be carried out, for example, by a software module such as the aforementioned issuer platform located on a server of an issuer or entity acting on behalf of an issuer.

In at least some cases, if none of the conditions are true, as per the "NO" branch of block 306, a continuous check can be carried out, as indicated by the loop.

In at least some cases, a further determination can be made, as per block 310, to determine whether one or more of the following conditions is true: (i) the user has left the primarily offline environment, and (ii) the user will imminently leave the primarily offline environment. If such is the case, as per the "YES" branch of block 310, an additional step 312 includes redistributing the total available balance split to favor online transactions.

In at least some cases, if none of the aforementioned conditions are true, as per the "NO" branch of block 310, a continuous check can be carried out, as indicated by the loop.

In one or more embodiments, there can be one or more parameters indicative of the offline balance; for example, monetary value, a transaction counter, a combination of one or more counters, or the like. There can be multiple counters that may track the number of offline uses, or other factors, besides or in addition to monetary value or parameters indicative thereof.

By way of example, a card or other device might have a total amount of 200 US Dollars (USD); for example, in a "normal" mode, with 25 USD available offline and 175 USD available online. Suppose this card or other device enters a predominately offline environment. Due, for example, to previously defined choices or a request by that environment (including a merchant associated therewith), the availability could be changed, for example, to 150 USD offline and 50 USD online. Suppose 25 USD are spent offline, leaving 125 USD offline and 50 USD online. Suppose this card or other device leaves the predominately offline environment. When this is determined (e.g., because device is an NFC cell phone or the device holder taps out at the exit gate or uses the card or other device in a different location, such as a local gas station), it may be desirable to deliberately re-allocate funds to, say, 25 USD offline and 150 USD online. That is, it may be desirable not to just allow the offline balance to naturally decline, but rather to actively change the split (e.g., because the holder may want to use funds for an internet transaction where offline amounts are not available).

Accordingly, it will be appreciated that the departure from the predominately offline environment can be determined in a variety of ways, e.g., purchase outside the environment, GPS or other positioning technology, deliberate logout (e.g., tapping out). Furthermore, the split between offline and online may be dynamically adjusted rather than just allowing the offline balance to naturally deteriorate and returning to the normal split upon the next replenishment.

Figure 5:
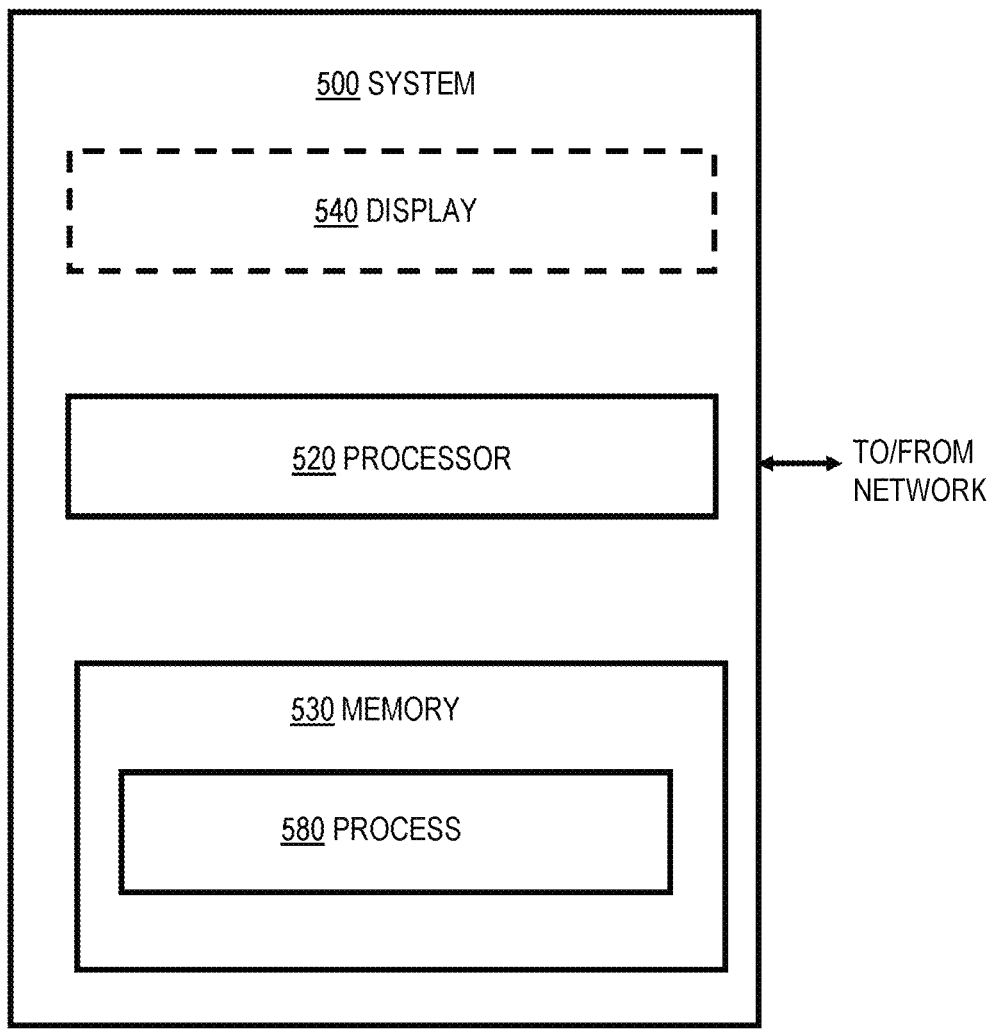
FIG. 5 is a block diagram of an exemplary computer system useful in one or more embodiments of the invention.

One or more embodiments employ a physical card or device such as 102, 112, 1302, 1420; a merchant terminal such as 122, 124, or 126; and a merchant server (e.g., a server as described with respect to FIG. 5 located in communication with the terminal(s)—for example, at a point-of-sale 146, 148 or coupled thereto, at location 2004, and so on). Furthermore, one or more embodiments employ an issuer server (e.g., a server as described with respect to FIG. 5 located, for example, at location 2010, and so on—not limited to a multiple issuer/multiple acquirer payment network), and a database in communication with the issuer server with, for example, details of current values available, potentially historic records of previous transactions, preferences as to how to operate, e.g., split to use in different environments (e.g., offline, normal).

The determinations in steps 306 and/or 312 can thus be made in a variety of ways. For example, an NFC mobile phone senses where it is and relays the location to the issuer, which determines that it should switch modes and/or redistribute the balance. In an alternative approach, when the banking product is used at a merchant terminal, the merchant server makes a request to the issuer to move the balance around or the issuer does this automatically based on stored preferences. Thus, the issuer knows where the device is (NFC mobile phone or the like); or the merchant requests that the balance be moved, or the issuer monitors transactions coming in and makes the move itself. For example, in a stadium, or upon entry to a stadium, it is reasonable to think that the person carrying the card or other device will be there for a while, so the stadium can request a balance move or the issuer can recognize that the merchant is a stadium registered as an offline environment.

As discussed above, the determination as to whether the user has entered or will soon enter a P.O.E. can be based on a variety of factors. In some cases, the determination can be based on clock time (e.g., time of day) and/or calendar time (e.g., day of the week, day of the month, or month of the year). Other approaches can, as noted, be based on merchant and/or merchant category code. In a further aspect, as discussed above, there may be a registration process (for example, triggered by presenting the card at an entrance gate or by the first use of the card in the environment) in association with entry of the user to the primarily offline environment, which is preferably transparent to the user (a switch back to the normal split may be effectuated upon leaving; for example, by presenting the card at an exit gate, or the first use of the card outside the environment). In a still further aspect, the determination step is accomplished by the merchant submitting a request to the issuer to transition between the primarily off-line and on-line modes.

In some instances, the user may have, or be given the opportunity, to choose a number of settings for his or her card, and when entering an environment, instead of the environment determining the online-offline split, the environment only determined the change between one pre-defined online-offline split and another predefined online-offline split. For example, there may be a "normal" mode and a "predominately offline" mode and the user may have some control over the two modes (e.g., the split for each mode). The environment then simply sets the normal or predominately offline mode as appropriate, but the split for each mode is predefined. In another aspect, the environment could ask for a change in the split to make some or all of the online amount available offline. Furthermore, in some cases the user may be afforded the opportunity to force a switchover, for example, via a web site, call center, or the like (i.e. one or more determining steps are based on a user request, such as via a text message, visit to a web site, use of an interactive voice response (IVR) system, or the like).

In some cases, the smart payment device can be a mobile device such as cellular telephone 1420, a PDA, or the like.

In the most general case, the online transaction can be contacted or contactless.

In some instances, periodically advise the user of the technique to be used for splitting the total available balance between the available offline balance and the available online balance. In one or more embodiments, periodically modify the technique to be used for splitting the total available balance between the available offline balance and the available online balance, based on at least one of historical usage of the smart payment device by the user, and demographics of the user.

As noted, in some instances, the smart payment device comprises a mobile device (e.g., NFC). The determining steps 306, 310 can be based on geographic location; for example, sensed by the smart payment device or sensed by a location-based service (device may not have GPS or the like but may communicate with its environment and determine location in such manner).

It is worth noting that in an electronic purse, such as Mondex® products, the physical money in the form of electronic money is actually on the card. In modern systems, money is no longer on the card but is on the server; however, transactions may be authorized to take place in an offline mode, but settlement requires an online settlement request. The functionality of modern systems nevertheless may appear to the consumer as functionality similar to a historic electronic purse.

Figure 4:
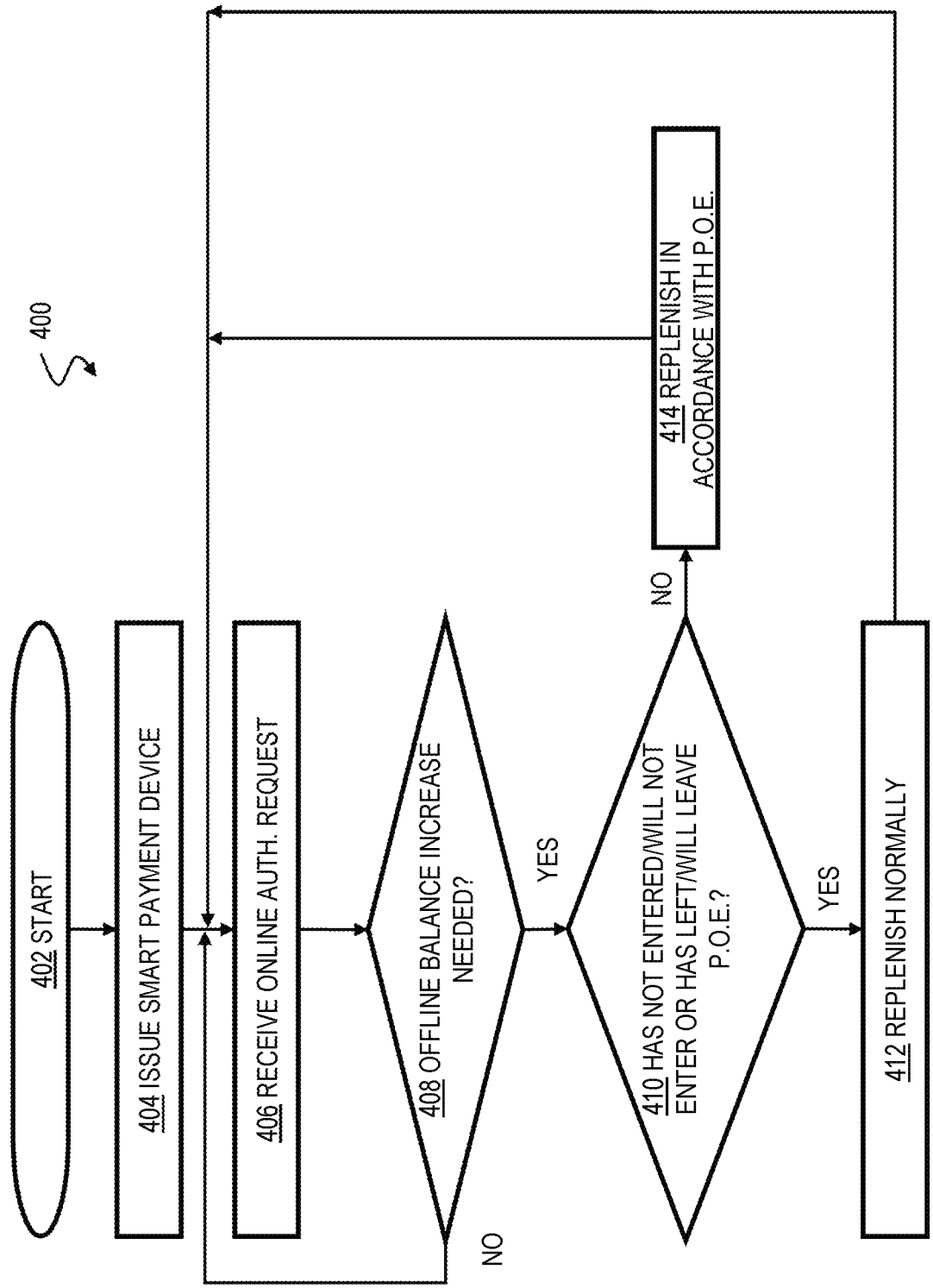
FIG. 4 is an exemplary flow chart according to another aspect of the invention.

Attention should now be given to flow chart 400 of FIG. 4, which begins in block 402. Step 404 is similar to step 304. In step 406, periodically receive, from the smart payment device, a communication in connection with an online transaction (for example, an on-line authorization request). In step 408, determine if the available offline balance requires replenishment (for example, whenever it has fallen below a predetermined amount, such as $15). If such is the case, as per the "YES" branch of block 408, determine in block 410 whether one or more of the following conditions is true: (i) determining step 306 in FIG. 3 is not true, i.e., the user has not entered a primarily offline environment, nor will the user imminently enter such an environment; the user has departed the primarily offline environment; and the user will imminently depart the primarily offline environment ("P.O.E."). If any of these conditions are true, as per the "YES" branch of block 412, then, as per block 412, replenish the offline balance, in association with the online transaction, in accordance with a lower limit (e.g., a normal limit for typical use; say, for example, bring the offline balance up to $50). However, if none of those conditions is true, as per the "NO" branch of block 412, then, as per block 414, replenish the offline balance, in association with the online transaction, in accordance with an upper limit (e.g., a higher limit for use in a P.O.E.; say, for example, bring the offline balance up to $100).

In at least some cases, if an offline balance increase is not needed, as per the "NO" branch of block 408, simply await another online authorization request in block 406 and check again, as indicated by the loop.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, payment devices such as cards 102, 112, 1302, 1420, a host, server, and/or processing center 140, 142, 144 (optionally with data warehouse 154) of a merchant, issuer, acquirer, processor, or operator of a network 2008 operating according to a payment system standard (and/or specification), and the like. Firmware might be employed, for example, in connection with payment devices such as cards 102, 112, 1302, 1420 and reader 132. Firmware provides a number of basic functions (e.g., display, print, accept keystrokes) that in themselves do not provide the final end-use application, but rather are building blocks; software links the building blocks together to deliver a usable solution.

FIG. 5 is a block diagram of a system 500 that can implement part or all of one or more aspects or processes of the invention. As shown in FIG. 5, memory 530 configures the processor 520 (which could correspond, e.g., to processor portions 106, 116, 130; a processor of a reader 132; processors of remote hosts in centers 140, 142, 144; processors of hosts and/or servers implementing various functionality, and the like) to implement one or more aspects of the methods, steps, and functions disclosed herein (collectively, shown as process 580 in FIG. 5). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center of an issuer or the like. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 124, 126, 140, 142, 144, 132, 2004, 2006, 2008, 2010, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network. Thus, elements of one or more embodiments of the invention, such as, for example, 124, 126, 140, 142, 144, 132, 2004, 2006, 2008, 2010, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 5) running a server program. It will be understood that such a physical server may or may not include a display, keyboard, or other input/output components. A "host" includes a physical data processing system (for example, system 500 as shown in FIG. 5) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include one or more software and/or firmware modules on the card or other payment device, one or more software and/or firmware modules on the merchant terminal, a merchant server module running on a merchant server, an issuer platform module running on an issuer server, and a database module in communication with the issuer server (including, e.g., on the issuer server or on a coupled database server). The method steps can then be carried out using the distinct software modules of the system, as described above, executing on one or more hardware processors of the devices, servers, and so on. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures. In at least some instances, messages may be in accordance with ISO standard 8583 (for example, authorization requests and authorization request responses). The ISO (International Organization for Standardization) 8583 standard for Financial transaction card originated messages Interchange message specifications is known to the skilled artisan and is expressly incorporated herein by reference in its entirety for all purposes.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
facilitating, by an issuer server comprising a processor, storage of an available offline balance in a memory of a smart payment device, said smart payment device configured for an offline transaction and an online transaction, said smart payment device having a total available balance, said total available balance being split between said available offline balance and an available online balance;
receiving, by said issuer server, an indication from at least one of said smart payment device and a merchant that said smart payment device has entered a primarily offline environment or said smart payment device will imminently enter said primarily offline environment, wherein said indication is one of a registration of said smart payment device and a request received by said issuer server; and
redistributing, by said issuer server, said total available balance to increase said available offline balance in response to said indication,
wherein said redistribution comprises a communication to said smart payment device causing said smart payment device to transition to a predominately offline mode and increase said available offline balance stored in said memory and to enable one or more offline transactions using said smart payment device having said available offline balance,
wherein subsequent to said redistributing of said total available balance to increase said available offline balance:
determining that said smart payment device has departed said primarily offline environment or said smart payment device will imminently depart said primarily offline environment; and
redistributing said total available balance to increase said available online balance in response to said determination that said smart payment device has departed said primarily offline environment or said smart payment device will imminently depart said primarily offline environment.

2. The method of claim 1, wherein said online transaction comprises a contact transaction, and wherein said online transaction comprises resetting said available offline balance to a predetermined fixed value.

3. The method of claim 1, wherein said online transaction comprises a contactless transaction.

4. The method of claim 1, further comprising periodically advising a user of said smart payment device of a technique used for splitting said total available balance between said available offline balance and said available online balance.

5. The method of claim 1, further comprising periodically modifying a technique used for splitting said total available balance between said available offline balance and said available online balance based on a historical usage of said smart payment device by a user of said smart payment device.

6. The method of claim 1, wherein said registration comprises an interaction between said smart payment device and a kiosk.

7. The method of claim 1, wherein said request is an authorization request received from said merchant in connection with a transaction using said smart payment device.

8. The method of claim 1, wherein said registration is transparent to a user of said smart payment device.

9. The method of claim 1, wherein said request is received from a user of said smart payment device.

10. An apparatus comprising:
   means for facilitating storage of an available offline balance in a memory of a smart payment device, said smart payment device configured for an offline transaction and an online transaction, said smart payment device having a total available balance, said total available balance being split between said available offline balance and an available online balance;
   means for receiving an indication from at least one of said smart payment device and a merchant that said smart payment device has entered a primarily offline environment or said smart payment device will imminently enter said primarily offline environment, wherein said indication is one of a registration of said smart payment device and a request received by an issuer server; and
   means for redistributing said total available balance to increase said available offline balance in response to said indication,
   wherein said means for redistribution comprises means for generating a communication to said smart payment device causing said smart payment device to transition to a predominately offline mode and increase said available offline balance stored in said memory and to enable one or more offline transactions using said smart payment device having said available offline balance,
   wherein subsequent to said redistributing of said total available balance to increase said available offline balance:
      redistributing said total available balance to increase said available online balance in response to determining that said smart payment device has departed said primarily offline environment or said smart payment device will imminently depart said primarily offline environment, and
      wherein said apparatus excludes a transmission medium and disembodied signal.

11. An apparatus comprising:
   a memory; and
   at least one processor, coupled to said memory, said at least one processor being operative to:
      facilitate storage of an available offline balance in a memory of a smart payment device, said smart payment device configured for an offline transaction and an online transaction, said smart payment device having a total available balance, said total available balance being split between said available offline balance and an available online balance;
      receive an indication from at least one of said smart payment device and a merchant that said smart payment device has entered a primarily offline environment or said smart payment device will imminently enter said primarily offline environment, wherein said indication is one of a registration of said smart payment device and a request received by said apparatus; and
      redistribute said total available balance to increase said available offline balance in response to said indication,
      wherein said redistribution comprises a communication to said smart payment device causing said smart payment device to transition to a predominately offline mode and increase said available offline balance stored in said memory and to enable one or more offline transactions using said smart payment device having said available offline balance,
      wherein subsequent to said redistributing of said total available balance to increase said available offline balance:
         redistributing said total available balance to increase said available online balance in response to determining that said smart payment device has departed said primarily offline environment or said smart payment device will imminently depart said primarily offline environment.

12. A system comprising:
   an issuer server comprising a processor;
   a smart payment device configured for an offline transaction and an online transaction, said smart payment device having a total available balance, said total available balance being split between an available offline balance and an available online balance, said smart payment device comprising a memory storing said available offline balance;
   a plurality of merchant terminals; and
   a payment processing network coupling said issuer server and said plurality of merchant terminals, said smart payment device being configured for communication with said plurality of merchant terminals;
   wherein said issuer server is operative to:
      obtain an indication from at least one of said smart payment device and a merchant that said smart payment device has entered a primarily offline environment or said smart payment device will imminently enter said primarily offline environment, wherein said indication is one of a registration of said smart payment device and a request received by said issuer server; and
      redistribute said total available balance to increase said available offline balance in response to said indication,
      wherein said redistribution comprises a communication to said smart payment device causing said smart payment device to transition to a predominately offline mode and increase said available offline balance stored in said memory and to enable one or more offline transactions using said smart payment device having said available offline balance,
      wherein subsequent to said redistributing of said total available balance to increase said available offline balance:
         redistributing said total available balance to increase said available online balance in response to determining that said smart payment device has departed said primarily offline environment or said smart payment device will imminently depart said primarily offline environment.

13. The system of claim 12, further comprising a kiosk, wherein said registration comprises an interaction between said smart payment device and said kiosk.

14. The system of claim 12, wherein said request is an authorization request received from said merchant in connection with a transaction using said smart payment device.

15. The system of claim 12, wherein said request is received from a user of said smart payment device.

* * * * *